United States Patent
Murphy et al.

(10) Patent No.: US 9,946,427 B1
(45) Date of Patent: Apr. 17, 2018

(54) DYNAMIC HOME SCREEN

(71) Applicant: Google Inc., Mountain View, CA (US)

(72) Inventors: Glen Murphy, Palo Alto, CA (US); Brian Rakowski, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 386 days.

(21) Appl. No.: 14/095,850

(22) Filed: Dec. 3, 2013

(51) Int. Cl.
*G06F 3/048* (2013.01)

(52) U.S. Cl.
CPC .................... *G06F 3/048* (2013.01)

(58) Field of Classification Search
CPC ... G06F 3/0481; G06F 3/04817; G06F 3/0482
See application file for complete search history.

(56) References Cited

U.S. PATENT DOCUMENTS

| | | | | |
|---|---|---|---|---|
| 2002/0160817 A1* | 10/2002 | Salmimaa et al. | ............ | 455/566 |
| 2002/0198882 A1* | 12/2002 | Linden | .............. | G06F 17/30867 |
| 2006/0041549 A1* | 2/2006 | Gundersen | ........ | G06F 17/30864 |
| 2006/0156209 A1* | 7/2006 | Matsuura et al. | ............ | 714/798 |
| 2006/0247938 A1* | 11/2006 | Thieret | .................. | G06Q 99/00 |
| | | | | 705/7.36 |
| 2012/0192113 A1* | 7/2012 | Higuchi | .................. | G06F 1/162 |
| | | | | 715/835 |
| 2012/0240073 A1* | 9/2012 | McCann | ............... | G06F 3/0482 |
| | | | | 715/775 |
| 2013/0080968 A1* | 3/2013 | Hanson | ................. | G06F 9/4443 |
| | | | | 715/783 |
| 2014/0006508 A1* | 1/2014 | Goyet | ..................... | H04L 67/22 |
| | | | | 709/204 |

OTHER PUBLICATIONS

Seifert, D., "Context is King: Cover For Android Changes Your Lock Screen As You Move," Oct. 24, 2013, 4 pgs., http://www.theverge.com/2013/10/24/5024652/cover-android-lock-screen-context-movement.

* cited by examiner

*Primary Examiner* — Andrey Belousov
*Assistant Examiner* — Seth A Silverman
(74) *Attorney, Agent, or Firm* — McDermott Will & Emery LLP (57) ABSTRACT

Various aspects of the subject technology relate to systems, methods, and machine-readable media for providing a set of objects for display in a dynamic user interface such as a home screen. A system is configured to receive usage data for a plurality of objects available to a computing device, the usage data comprising a time and date that each object was most recently selected by a user and a number of times each object was selected by the user for a period of time and calculate a priority score for each object in the plurality of objects based on the usage data. The system is further configured to select a set of objects from the plurality of objects based on the priority score for each object in the plurality of objects and provide the set of objects for display in a dynamic user interface of the computing device.

17 Claims, 5 Drawing Sheets

DYNAMIC HOME SCREEN

BACKGROUND

The present disclosure generally relates to user interfaces and, in particular, to a home screen for a computing device.

A home screen is a user interface on a computing device that is used to access other content, applications, resources, or services provided by the computing device. In some cases, the computing device may default to the device home screen when the device is turned on, awaken out of a sleep or hibernating mode where the display is turned off, or otherwise activated. In some cases the computing device may have a user input (e.g., a physical button, a button shown on a display, or a combination of buttons) that may be used by the user to display the home screen.

SUMMARY

Various aspects of the subject technology relate to a system for providing a set of objects for display in a dynamic user interface. The system includes one or more processors and a machine-readable medium comprising instructions stored therein, which when executed by the one or more processors, cause the one or more processors to perform operations. The operations include identifying a set of conditions for which objects are to be displayed on a client device, retrieving usage data, corresponding to the identified set of conditions, for a plurality of objects, the usage data comprising a time and date that each object was most recently selected by a user and a number of times each object was selected by the user for a period of time, and calculating, based on the usage data, a priority score for each object in the plurality of objects. The operations further include selecting, based on the priority score for each object in the plurality of objects, a set of objects from the plurality of objects, determining, based on the usage data, a display size for each object in the set of objects, and providing the set of objects for display in accordance with the display size.

Other aspects of the subject technology relate to a method for providing a set of content items for display in a dynamic home screen. The method includes receiving usage data for a plurality of content items available to a computing device, the usage data comprising a time and date that each content item was most recently selected by a user and a number of times each content item was selected by the user for a period of time, calculating, using a processor and based on the usage data, a priority score for each content item in the plurality of content items, selecting, based on the priority score for each content item in the plurality of content items, a set of content items from the plurality of content items, and providing the set of content items for display in a dynamic home screen of the computing device.

Various aspects of the subject technology relate to a non-transitory machine-readable medium comprising instructions stored therein, which when executed by a machine, cause the machine to perform operations. The operations include identifying a set of conditions for which objects are to be displayed in a user interface on a client device and retrieving usage data corresponding to the identified set of conditions for a plurality of objects. The usage data includes a time and date that each object was most recently selected, a number of times each object was selected for a period of time, and whether a payment was made in connection with each object. The operations further include providing, based on the usage data, for the display of a selected set of objects from the plurality of objects.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Some devices have home screens that are organized into a grid, with icons for applications installed on the computing device being placed at locations within the grid. A user may select the icon for the application in order to open the application and access the content, services, or other resources provided by the open application. In some cases, once the application is open, the user may need to provide additional input to navigate the interface provided by the application in order to reach a desired resource. However, taking additional steps to reach a desired resource may be time consuming and requires effort.

If there are a multitude of icons for applications on the home screen, the icons may clutter the home screen and make it more difficult for a user to find the desired application. Furthermore, if a user wishes to rearrange the contents of the home screen, the user may manually move particular icons into different locations on the grid, remove icons from the home screen, or add icons to the home screen. However, manually rearranging, adding, or removing home screen icons also may be time consuming and requires effort.

Various aspects of the subject technology relates to providing a dynamic user interface that automatically determines objects that the user is likely to use and places icons for those objects in positions on the user interface (e.g., a device home screen) that are more visible or more convenient to the user. A system may be configured to generate usage data for objects on the computing device. The usage data for the objects may be used to determine which objects are displayed on the dynamic user interface, where the objects are displayed, and how the objects are displayed. Furthermore, as usage data changes over time, the appearance of the objects displayed on the dynamic user interface may also automatically change. The objects that appear on the dynamic user interface may include icons for content (e.g., uniform resource identifiers, music files, video files, documents, images, ebooks, articles, or any other content formats) as well as icons for applications or services provided by the computing device.

Figure 1:
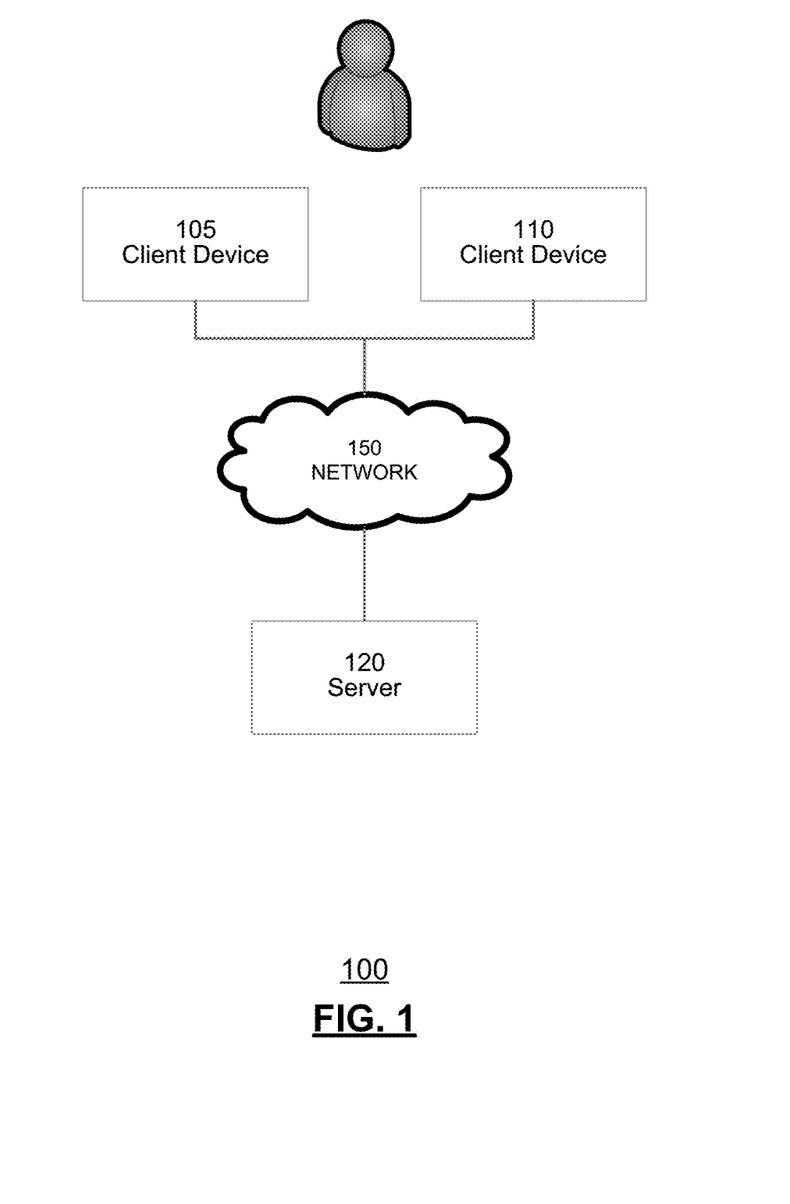
FIG. 1 is a conceptual block diagram illustrating an environment in which a client device may provide a dynamic user interface, in accordance with various aspects of the subject technology.

FIG. 1 is a conceptual block diagram illustrating an environment 100 in which a client device may provide a dynamic user interface, in accordance with various aspects of the subject technology. Although FIG. 1 illustrates a client-server environment 100, other aspects of the subject technology may include other configurations including, for example, peer-to-peer environments or single system environments. The network environment 100 may include at least one server 120 and at least one client device, such as client devices 105 and 110, connected over a network 150.

Each client device 105 and 110 may be any computing machine capable of providing a user with access to various resources. For example, the client devices 105 and 110 may be configured to run a number of applications, load various content (e.g., audio content, video content, documents, web pages, other files, or other non-executable digital content), communicate with other devices or people (e.g., make phone calls, send messages or emails, etc.), or access services provided by a remote server such as server 120 shown in FIG. 1. Client devices 105 and 110 may include, for example, mobile phones, tablets, desktop computers, laptops, global positioning system (GPS) devices, set top boxes, consoles, or smart appliances.

Each client device may be associated with a user. For example the user may be the owner of a client device or a person logged in to an account on the client device. In some cases, a user may be associated with multiple client devices 105 and 110. For example, one client device 105 may be the user's mobile phone and another client device 110 may be a user's desktop computer, laptop, tablet, or smart television.

According to various aspects of the subject technology, the usage data generated for a user may be associated with a single client device 105 of the user's or for a number of different client devices 105 and 110 associated with the user. Accordingly, the usage data from one or more client devices 105 and 110 may be used to determine how objects are displayed on a dynamic user interface for one client device 105 or for a number of client devices 105 and usage for one client device 105 may affect the appearance of the dynamic user interface on another client device 110.

The network 150 can include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The server 120 may be any computing machine having a processor, a memory, and communications capability that may be used to provide services to one or more client devices 105. In some aspects, the server 120 may be a virtual entity that might refer to a cluster or even multiple clusters of servers.

According to some aspects of the subject technology, a system configured to provide a dynamic user interface based on usage data may be implemented on a server 120 and/or on one or more client devices 105. For example, according to aspects where the system is implemented on a single client device 105, the system may be configured to generate usage data for objects on the client device 105 and use the usage data for the client device 105 to determine which objects are displayed on the dynamic user interface, where the objects are displayed, and/or how the objects are displayed on the client device 105.

According to other aspects of the subject technology, where the system is implemented on a number of client devices 105 and 110, on a server 120, or on a combination of computing machines, the usage data from one or more client devices 105 and 110 may be used to determine how objects are displayed on a dynamic user interface for one client device 105 or for a number of client devices 105 and usage for one client device 105 may affect the appearance of the dynamic user interface on another client device 110.

Figure 2:
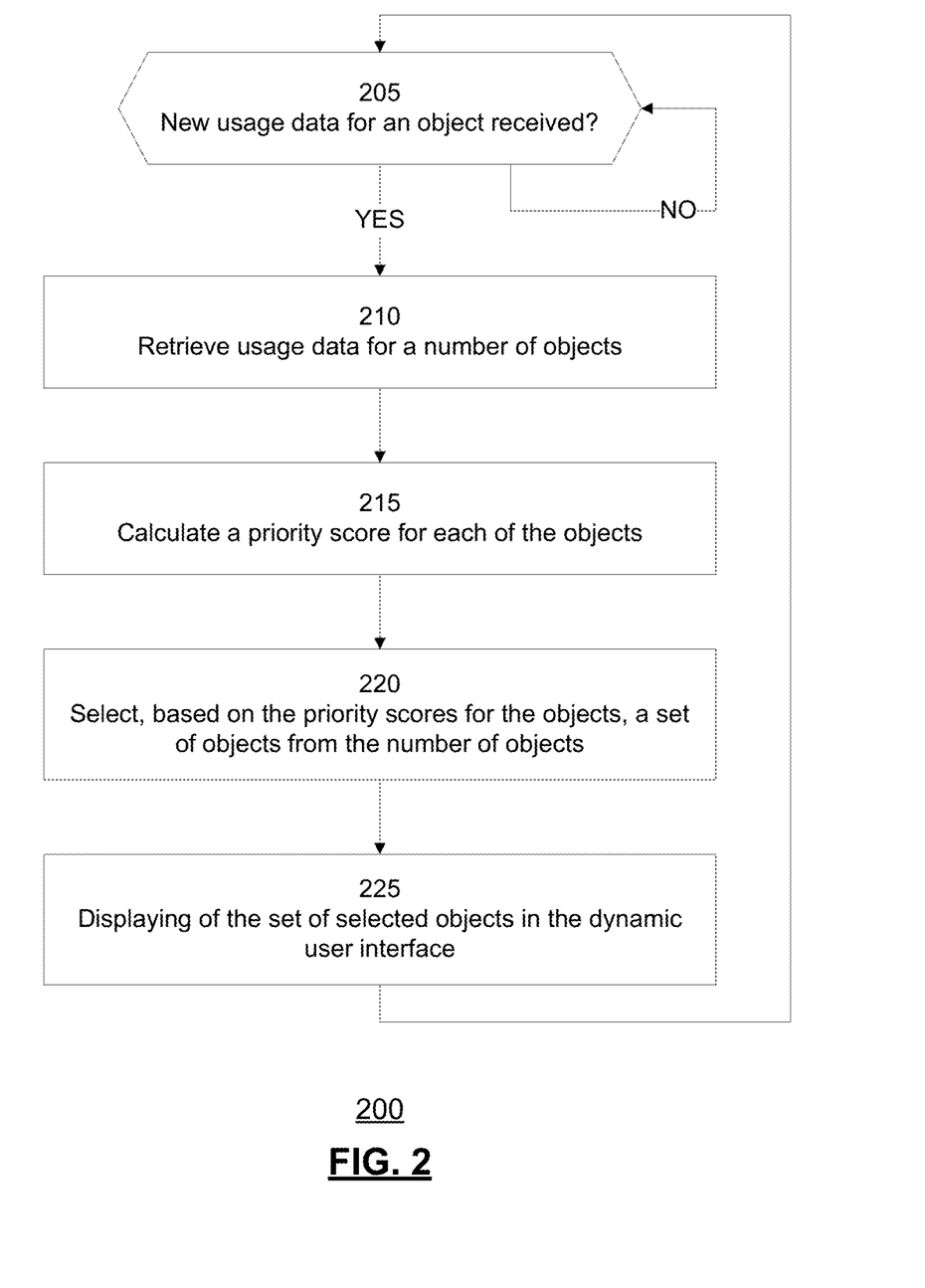
FIG. 2 is a flow chart illustrating an example process for providing a dynamic user interface based on usage data, in accordance with various aspects of the subject technology.

FIG. 2 is a flow chart illustrating an example process 200 for providing a dynamic user interface based on usage data, in accordance with various aspects of the subject technology. Although the blocks in process 200 are shown in a particular order, certain blocks may be executed in different orders or at the same time.

According to various aspects of the subject technology, a system may be configured to monitor a user's usage of various objects and generate usage data for the various objects. For example, the system may generate usage data each time a user selects an object for loading or activation on a client device 105. Possible objects may include user selectable items such as applications (e.g., an email application, a calendar application, a document reader/editor, a navigation application, a weather application, a telephone or other communication application, a cloud service application, etc.), content (e.g., uniform resource locators, music files, video files, documents, images, ebooks, articles, or any other content formats), or any other item that an operating system on the client device 105 allows a user to select.

In some implementations, possible objects may also include items that are selectable within an application or item of content. For example, in a telephone application or other communication application (e.g., an instant messaging application, a text messaging application, or a voice over Internet Protocol application), a user may select a contact with which to communicate. Accordingly, the contact may be a selectable object. For cloud service applications that allow a user to load content (e.g., ebooks, articles, blogs or blog entries, music, or personal files) stored on a server or stored locally, the user may select a particular piece of content. Accordingly, the piece of content may also be a selectable object.

In a navigation or mapping application, the user may store personalized locations (e.g., a home location) and select a personalized location to navigate to. Accordingly, the home location may be a selectable object. In a web browser, the user may select a bookmark associated with a uniform resource locator (URL) or input another URL. Accordingly, the selected URL may also be a selectable object. In some cases, portions of content (e.g., chapters or pages in a book or document) may be selectable objects.

Each time an object on the client device 105 is selected, by the user, for loading or activation, the system may generate or update usage data for the selected object and store the usage data. The usage data may be stored in a memory on the client device 105, on a server 120, or on both. If no usage data for the selected object has been stored yet, the system may create a new entry for the selected object and add the usage data into the entry. If usage data for the selected object already exists, the system may update the entry containing usage data for the selected object.

The usage data for an object may include, for example, an object identifier for the selected object, a category or type of the object selected, and a record of the user selections of the object. The record of the user selections of the object may include, for example, a number of times the object was selected by the user in one or more periods, times and dates for one or more user selections of the object, a location (e.g., location coordinates, a city, a zip code, a neighborhood, etc.) of the client device 105 when the object was selected for each user selection of the object, and/or a device identifier for the client device 105 on which the object was selected for each user selection of the object. According to various aspects of the subject technology, the usage data for an object may include all of the information described above, a subset of the information described above, alternative information, or some additional information.

At block 205, the system may determine whether new usage data for an object on a client device 105 has been received. The system may check for new usage data that has been stored on a periodic basis (e.g., every 30 minutes) or in response to one or more actions such as a user selection of an object. If new usage data for an object has not been received, the system may continue to wait for new usage data.

If new usage data for an object is received, the system may retrieve usage data for a number of objects available to a client device 105 or available to a number of client devices (e.g., client devices 105 and 110) associated with the user at block 210. The usage data may be retrieved from a memory (e.g., a database, a hard drive, or other memory device) on a server 120 or on a client device 105 or 110. At block 215, the system may calculate a priority score for each of the objects based on the usage data for those objects. The priority for each object may reflect a likelihood that a user may want to see the object on a dynamic user interface or the likelihood that the user will use the object again.

The priority score for each object may be based on various signals or factors derived from certain pieces of usage data for the object. For example, the system may calculate the priority score by using a formula that assigns various weights to various factors or signals. One example formula may be in the format provided below:

$$\text{Priority Score} = (w1 \cdot f1) + (w2 \cdot f2) + (w3 \cdot f3) \ldots$$

where f1, f2, and f3 are scores for various signals and w1, w2, and w3 are weights assigned to the factors. In another aspect, the signal scores may be first converted into a number between 0 and 1 before they are used in the formula to calculate the priority score.

According to some aspects of the subject technology, objects recently used by the user or objects that are often used by the user may be more likely to be used again. Accordingly, in some aspects of the subject technology, the system may calculate a priority score for an object based on how recently the object has been selected and/or how often the object has been selected. For example, the system may generate a signal score based on the time and date that the object was most recently selected by the user and a signal score based on a number of times the object was selected by a user for one or more time periods (e.g., the last 2 days, the past week, etc.) based on the usage data. One or both of these signal scores may be weighted and used to calculate the priority score for each object.

Another signal used may be whether or not the user has made a payment in connection to the object. For example, in some cases, a user may pay to purchase certain objects (e.g., applications, music, an ebook, or other content). The system may determine that whether a user has paid for the object or content related to the object should be a positive factor in calculating the priority score for the object. If the user paid for an object, the user may be more likely to want the object to be displayed on the dynamic user interface. Accordingly, the system may calculate a signal score based on whether or not the user paid for the object. In some aspects the signal score may be 1 if the user paid for the object and a 0 if the user did not pay for the object. In other aspects the signal score may be calculated based on how much the user paid for the object. The signal score may then be weighted and used to calculate the priority score for each object. As will be discussed in further detail below, additional signals may also be used to calculate priority scores for the objects.

After the priority scores for the objects are calculated, at block 220, the system selects a set of objects for display. According to some aspects, the system may select a predetermined number of objects for display based on their respective priority scores or the system may select objects associated with priority scores above a threshold. At block 225, the system provides the set of objects for display in a dynamic user interface (e.g., a home screen) for a client device 105. If the system is not implemented on the client device 105 (e.g., if the system is implemented on a server 120 or another client device 110) the system may be configured to transmit the selected objects (e.g., identifiers for the selected objects) over a network 150 to the client device 105. Once received at the client device 105, the client device 105 may display the selected objects in the dynamic user interface such as a home screen.

By displaying the objects that a user may want to see the object or that the user will likely use again on a dynamic user interface, the system may provide a less cluttered user interface for the user that does not need to be manually configured or rearranged by the user. Furthermore, the dynamic user interface may provide a more convenient way to select certain objects (e.g., items that are selectable within an application or item of content) that may take fewer steps. If the user's selection of objects changes over time, the objects displayed in the dynamic user interface may also change to fit the user's usage data.

Figure 3:
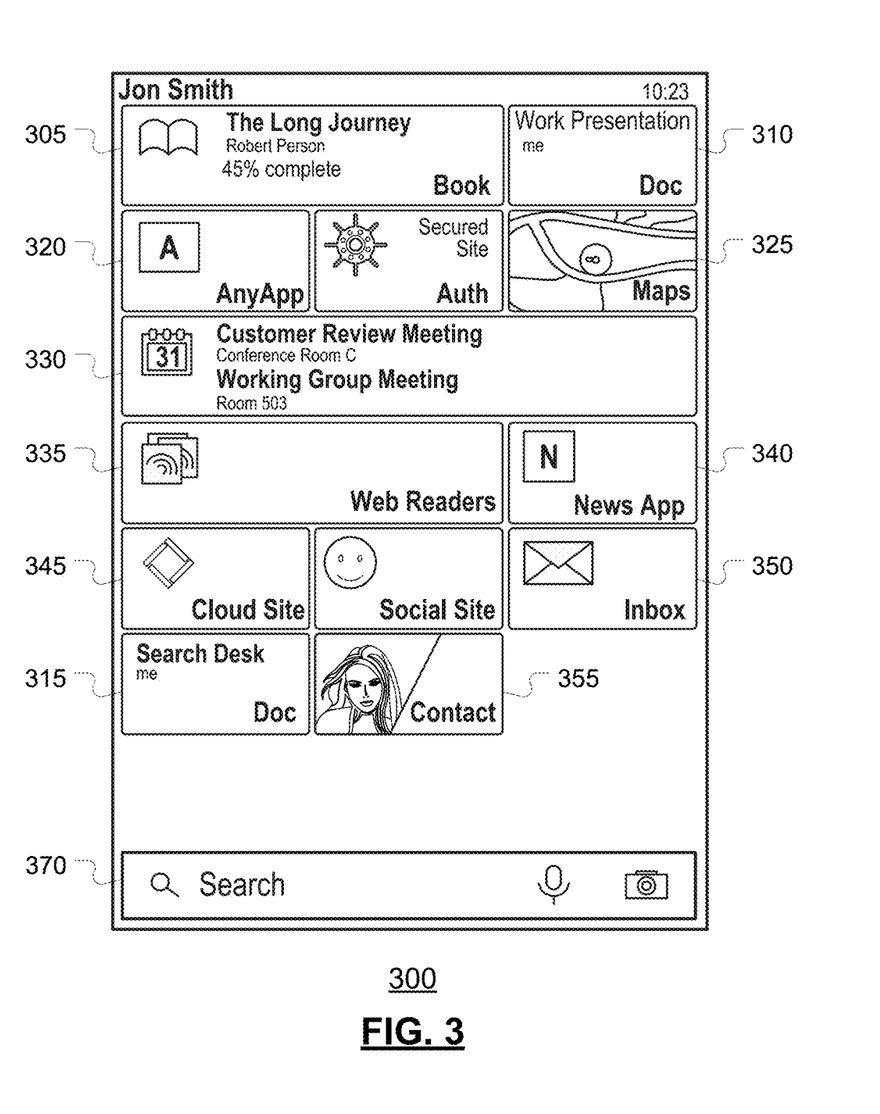
FIG. 3 is an illustration of an example user interface showing a web browser, in accordance with various aspects of the subject technology.

FIG. 3 is an illustration of an example dynamic home screen interface 300, in accordance with various aspects of the subject technology. The dynamic home screen interface 300 may be displayed on, for example, a tablet, a mobile phone, a laptop, a desktop computer, a smart appliance, or any other computing machine with, or in communication with, a display. The home screen interface 300 may include a number of objects selected and displayed based on usage data for the user.

The home screen interface 300 illustrated in FIG. 3 includes an object 305 for a particular page, chapter, or portion of a book and objects 310 and 315 for documents.

The objects 305, 310, and 315 may be displayed along with various information about the book or document for which they represent. For example, the object 305 may be displayed showing the book title, the author, and/or how much progress the user has made in reading the book. The object 310 may be displayed showing the document title, the creator of the document, the user who last accessed the document, and/or the last time the document was modified. When a user selects the object 305, the computing machine may load the page, chapter, or portion of the book. Similarly, the computing machine may also load the document in response to a user selection of objects 310 or 315. In some cases, the book or document may be loaded from local memory on the computing machine. In other cases, the book or document may be loaded from a cloud service or retrieved from a server via a network.

The home screen interface 300 also includes objects 320, 325, 330, 335, 340, 345, and 350 for a variety of applications. When a user selects one of the objects 320, 325, 330, 335, 340, 345, and 350, the computing machine may launch the application corresponding to the selected object. The home screen interface also includes an object 355 for a contact. In response to a user selection of the object 355 for the contact, the computing machine may launch an application with instructions to initiate communications (e.g., via text or a phone call) with the selected contact. According to some aspects of the subject technology, the home screen interface 300 also provides a search interface 370 that enables the user to search for objects on the computing machine that are not visible in the home screen interface 300 that the user wishes to select.

According to some aspects of the subject technology, the priority scores for the objects may also be used to determine where and how the objects are displayed in the dynamic user interface. For example, for each object to be displayed in a dynamic user interface on a client device 105, one or more display characteristics may be determined for the object based on the object's priority score. The display characteristics may include, for example, a size, a location, a color, or any other characteristic of how the object is displayed in the dynamic user interface. For example, objects that the user is more likely to use (e.g., objects that have a higher priority score) may be larger than other objects that the user is less likely to use. Furthermore, objects that the user is more likely to use may be placed in one or more locations that are assigned to higher priority objects while other objects that the user is less likely to use are placed in other locations.

In one implementation, different portions of the dynamic user interface may be reserved for the objects with the highest priority scores. In another implementation, the objects may be displayed in an order based on their priority scores. In still another implementation, there may be multiple size thresholds where the size of an object displayed in the dynamic user interface depends on whether or not the priority score for the object exceeds one or more of the size thresholds. As can be seen in the dynamic home screen interface 300 of FIG. 3, the objects displayed may be of various sizes and placed in various locations. In other aspects, the objects displayed may be color coded, texture coded, highlighted, or displayed with other display characteristics. The display characteristics of these objects may be determined based on each object's priority score.

According to various aspects of the subject technology, display characteristics for objects displayed in the dynamic user interface may also be based on one or more specific signal scores for the object. For example, while the location of an object may be determined based on the priority score of the object, the size of the object may be determined based on the signal score that reflects how often the object was used in a particular time period. Alternatively, the location of an object may be determined based on the signal score that reflects how often the object was used in a particular time period, the size of the object may be determined based on the priority score of the object.

According to various aspects of the subject technology, additional types of usage data may also be used to select which objects are displayed in a dynamic user interface, how the objects are displayed, and/or where the objects are displayed. For example, contextual information in the usage data such as a location for each selection usage of an object, a time/date for each selection of an object, the client device 105 that the user used when selecting the object may also be used to calculate priority scores. Accordingly, the priority scores for each object may be calculated using usage data that reflects conditions that match conditions in the current environment.

For example, the system may identify usage data that corresponds to the device being used, the current location of the device, and the current time/date to information in the usage data. The system may calculate priority scores for the objects to be displayed based on the identified usage data and display objects on the dynamic user interface based on the calculated priority scores. Accordingly, as the conditions in the current environment change (e.g., the user goes from work to home, the time changes from afternoon to evening, or the device being used changes), the dynamic user interface may also change.

According to some aspects of the subject technology, different sets of objects may be displayed in the dynamic user interface depending on current conditions. For example, people may select different objects at different locations. Accordingly, one set of objects may be displayed when the client device 105 is at a home location, while another set of objects may be displayed when the client device 105 is at a work location, a gym location, or at a mall location. People may also select different objects at different times. Accordingly, one set of objects may be displayed during certain hours of the day, while another set of objects may be displayed at other hours of the day. Furthermore, some objects may be displayed on certain days (e.g., weekdays) and other objects may be displayed on other days (e.g., weekends).

Combinations of different conditions may also be used to determine which objects are displayed on the dynamic user interface. For example, at a work location, on weekdays, during the hours of 9:00 AM to 4:00 PM, one set of objects may be displayed (e.g., the objects the user typically selects for work). However, at a work location, on Thursdays, during the hours of 4:00 PM to 5:00 PM, another set of objects may be displayed (e.g., the objects the user typically selects to plan a dinner or visit to a bar with one or more of the user's contacts). In another scenario, in accordance with the usage data, an object corresponding to a chapter of a book that the user recently selected may be displayed during the weekend when the user is at a library or coffee shop.

In another scenario, users may use different object on different client devices 105 and 110. Accordingly, the set of objects that are to appear in a dynamic user interface on a particular client device 105 may also be determined based on usage data for that client device 105. For example, the usage data for that client device 105 may be used to calculate the priority scores for objects on the client device 105 or the usage data for that client device 105 may be weighted more than other usage data when calculating the priority scores for objects on the client device 105.

According to various aspects of the subject technology, the system may be configured to identify a set of conditions for the client device 105 for which the set of objects are to be provided for display. The set of conditions may be certain combinations of conditions that one or more client devices 105 and 110 associated with the user experience or a combination of conditions that correspond with the current conditions for the client device 105 where the set of objects are to be displayed. The set of conditions may include, for example, one or more locations, one or more times in a day, one or more days of a week, month or year, or one or more client devices.

The system may further filter out the usage data that does not correspond to the identified set of conditions. For example, the system may retrieve usage data for objects that correspond to the identified set of conditions and entries in the records of user selections for the objects that correspond to the identified set of conditions. The retrieved usage data may then be used to calculate priority scores for the objects available to the computing device. The priority scores may then be used to select a set of objects to be displayed in the dynamic user interface and/or determine how and where the set of objects are to be displayed. Accordingly, as the user moves from one location to another, uses different client devices, and/or as time passes, the system may provide different sets of objects to be displayed in the dynamic user interface (e.g., a home screen for a client device).

Figure 4:
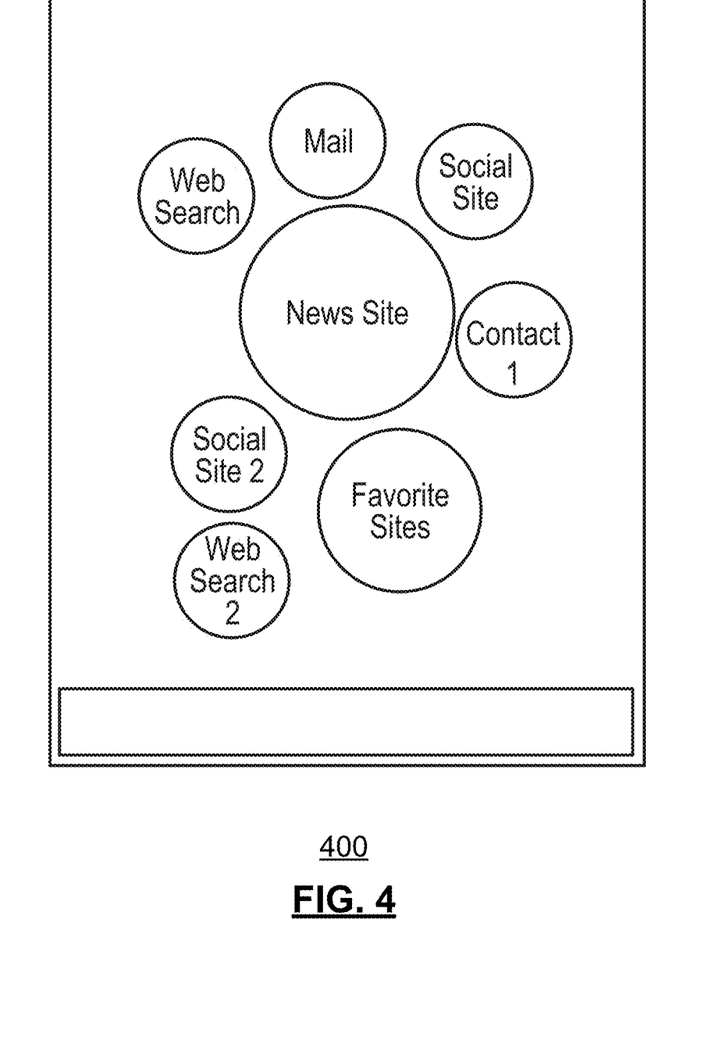
FIG. 4 is an illustration of an example user interface showing a web browser, in accordance with various aspects of the subject technology.

Although the dynamic interface in FIG. 3 is shown as being organized into a grid, according to some aspects of the subject technology, the dynamic user interface may not be organized as a grid. Instead, the objects may be placed in the dynamic user interface at non-aligned positions and as one or more different shapes. For example, FIG. 4 is an illustration of an example dynamic home screen interface 400, in accordance with various aspects of the subject technology. In FIG. 4, the objects displayed in the home screen interface 400 are circular.

Figure 5:
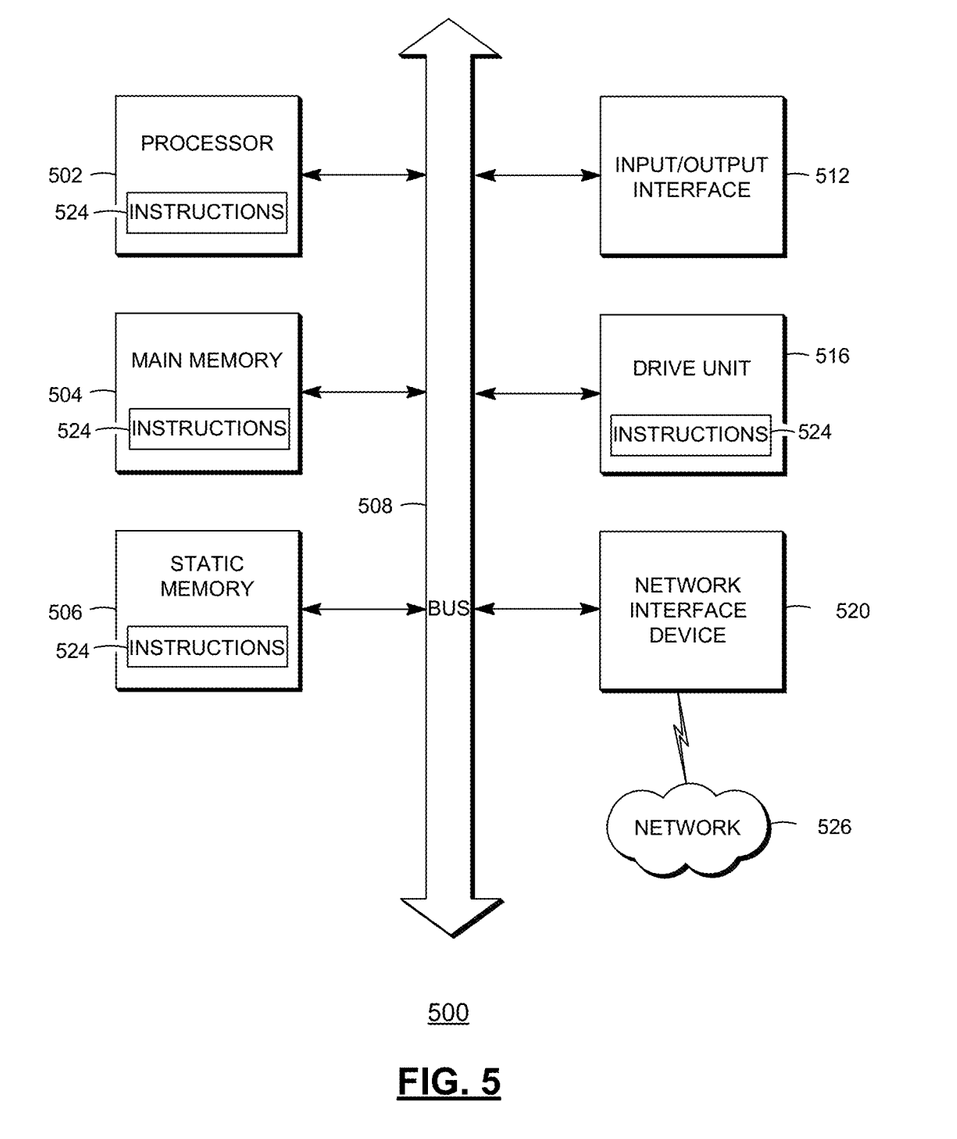
FIG. 5 is a block diagram illustrating an example computer system with which any of the computing machines, devices, or systems discussed herein may be implemented, in accordance with some aspects of the subject technology.

FIG. 5 is a block diagram illustrating an example computer system with which any of the computing machines, devices, or systems discussed herein may be implemented, in accordance with some aspects of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for providing a set of content items for display in a dynamic home screen, the method comprising:
   receiving usage data for a plurality of content items available to a plurality of computing devices, the usage data associated with a user and the plurality of computing devices, the usage data comprising a time and date that each content item was most recently selected by the user, a number of times each content item was selected by the user for a period of time, and a device identifier and a geographical location corresponding to a respective one of the plurality of computing devices used by the user when selecting each content item;
   calculating, using a processor and based on the usage data, a priority score for each content item in the plurality of content items;
   selecting, based on the priority score for each content item in the plurality of content items, a computing device of the plurality of computing devices being used by the user, and a geographical location of the computing device of the plurality of computing devices being used by the user, a set of content items from the plurality of content items;
   determining display characteristics for the set of content items comprising a size and a location for each content item in the set of content items, wherein the size for each content item in the set of content items is determined based on one of the number of times the content item was selected by the user for a period of time or the priority score of the content item, and wherein the location for the content item in the set of content items is determined based on the other one of the number of times the content item was selected by the user for a period of time or the priority score of the content item; and
   providing the set of content items for display in a dynamic home screen of the computing device of the plurality of computing devices based on the display characteristics.

2. The computer-implemented method of claim 1, further comprising
   generating usage data for the plurality of content items based on user selection of at least one content item in the plurality of content items.

3. The computer-implemented method of claim 2, further comprising facilitating the storage of the generated usage data at a server, wherein the providing of the set of content items comprises transmitting, via a network, the set of content items to the computing device.

4. The computer-implemented method of claim 2, further comprising facilitating the storage of the generated usage data on a memory at the computing device.

5. The computer-implemented method of claim 1, wherein the plurality of content items comprises at least one of a contact associated with the user, a uniform resource identifier, or a file.

6. The computer-implemented method of claim 1, wherein the usage data for each content item in the plurality of content items further comprises an indication of whether a payment was made in connection with the content item, and wherein the priority score for the content item is further calculated based on the indication.

7. The computer-implemented method of claim 1, wherein a predetermined number of content items are selected for the set of content items.

8. The computer-implemented method of claim 1, wherein content items with priority scores above a threshold are selected for the set of content items.

9. The computer-implemented method of claim 1, further comprising
   identifying a set of conditions for which the set of content items are to be displayed in the dynamic home screen, wherein the received usage data for the plurality of content items corresponds to the identified set of conditions.

10. A system for providing a set of objects for display, the system comprising:
    one or more processors; and
    a machine-readable medium comprising instructions stored therein, which when executed by the one or more processors, cause the one or more processors to perform operations comprising:
      identifying a set of conditions for which objects are to be displayed on a client device of a plurality of client devices;
      retrieving usage data, corresponding to the identified set of conditions, for a plurality of objects, the usage data associated with a user and the plurality of client devices, the usage data comprising a time and date that each object was most recently selected by the user, a number of times each object was selected by the user for a period of time, and a device identifier and a geographical location corresponding to a respective one of the plurality of computing devices used by the user when selecting each content item;
      calculating, based on usage data, a priority score for each object in the plurality of objects;
      selecting, based on the priority score for each object in the plurality of objects, an identifier of a computing device of the plurality of computing devices being used by the user and a geographical location of the computing device of the plurality of computing devices being used by the user, a set of objects from the plurality of objects;
      determining a display size and a display location for each object in the set of objects wherein the size for each object in the set of objects is determined based on one of the number of times the object was selected by the user for a period of time or the priority score of the object, and wherein the location for each object in the set of objects is determined based on the other one of the number of times the object was selected by the user for a period of time or the priority score of the object; and
      providing the set of objects for display in accordance with the display size and the display location.

11. The system of claim 10, wherein the operations further comprise generating usage data for the plurality of objects based on user selection of at least one object in the plurality of objects.

12. The system of claim 10, wherein the usage data for each object in the plurality of objects further comprises an indication of whether a payment was made in connection to the object, and wherein the priority score for the object is further calculated based on the indication.

13. The system of claim 10, wherein the plurality of objects comprise at least one of an application, a content item, or a selectable item within the application or the content item.

14. The system of claim 10, wherein the set of objects are displayed in a home screen.

15. A non-transitory machine-readable medium comprising instructions stored therein, which when executed by a machine, cause the machine to perform operations comprising:

identifying a set of conditions for which objects are to be displayed in a user interface on a client device of a plurality of client devices associated with a user and being used by the user;

retrieving usage data, corresponding to the identified set of conditions, for a plurality of objects, the usage data associated with the plurality of client devices and the user, the usage data comprising a time and date that each object was most recently selected, a number of times each object was selected for a period of time, and a device identifier and a geographical location corresponding to a respective one of the plurality of computing devices used by the user when selecting each content item;

selecting, based on the usage data for each object in the plurality of objects, the client device, and a geographical location of the computing device of the plurality of computing devices being used by the user, a selected set of objects from the plurality of objects;

determining display characteristics for the selected set of objects comprising a size and a location for each object in the set of objects, wherein the size for each object in the set of objects is determined based on one of the number of times the object was selected by the user for a period of time or the priority score of the object, and wherein the location for each object in the set of objects is determined based on the other one of the number of times the object was selected by the user for a period of time or the priority score of the object, and providing for display of the selected set of objects from the plurality of objects on the user interface of the client device in accordance with the display characteristics.

16. The non-transitory machine-readable medium of claim 15, wherein the selecting the selected set of objects is further based on identifying the client device.

17. The non-transitory machine-readable medium of claim 15, wherein the plurality of objects comprise at least one of a contact to initiate communications with, a portion of a content item, or a stored location.

* * * * *